(12) United States Patent
Whitton et al.

(10) Patent No.: US 6,348,107 B1
(45) Date of Patent: Feb. 19, 2002

(54) COMPOSITIONS AND METHOD FOR REMOVING PAINT FROM A SUBSTRATE

(75) Inventors: Colin Alfred Whitton, Bucks; Joanna May Braley, Middlesex; Angela Mary Lawlor, Oxfordshire, all of (GB)

(73) Assignee: Chemetall PLC

( * ) Notice: Subject to any disclaimer, the term of this patent is extended or adjusted under 35 U.S.C. 154(b) by 0 days.

(21) Appl. No.: 09/284,708

(22) PCT Filed: Oct. 22, 1997

(86) PCT No.: PCT/GB97/02917

§ 371 Date: Apr. 19, 1999

§ 102(e) Date: Apr. 19, 1999

(87) PCT Pub. No.: WO98/17734

PCT Pub. Date: Apr. 30, 1998

(30) Foreign Application Priority Data

Oct. 22, 1996 (GB) .............................................. 9621955

(51) Int. Cl.⁷ .............................. B08B 3/00; C09D 9/00
(52) U.S. Cl. .............................. 134/38; 134/26; 134/28; 134/29; 134/4; 510/201; 510/202; 510/206; 510/207
(58) Field of Search .............................. 134/38, 26, 28, 134/29, 4; 510/201, 202, 206, 207

(56) References Cited

U.S. PATENT DOCUMENTS

| 4,619,706 A | * | 10/1986 | Squires et al. .................. 134/2 |
| 5,454,985 A | * | 10/1995 | Harbin ........................ 252/558 |
| 5,569,410 A | * | 10/1996 | Distaso ........................ 510/202 |
| 5,721,204 A | * | 2/1998 | Maxwell et al. ............ 510/206 |

FOREIGN PATENT DOCUMENTS

| DE | 3325166 A | * | 1/1985 |
| EP | 0611214 A | * | 8/1994 |
| GB | 1114220 | * | 5/1968 |

* cited by examiner

Primary Examiner—Zeinab El-Arini
(74) Attorney, Agent, or Firm—Andrus, Sceales, Starke & Sawall, LLP

(57) ABSTRACT

A paint stripper for use by immersion of a painted substrate in a bath of the composition or application in place has two phases, one aqueous and the other of partially water soluble organic solvent. The aqueous phase is saturated with organic solvent. The organic solvent is preferably benzyl alcohol, dibasic ester or ethyl-e-ethoxypropionate, The total amount of organic solvent in the bath is suitably in the range 2 to 20%. The stripper may be acid or alkali activated. The application stripper is thickened to avoid separation during storage.

15 Claims, No Drawings

COMPOSITIONS AND METHOD FOR REMOVING PAINT FROM A SUBSTRATE

This is a national stage application of PCT/GB97/02917 filed Oct. 22, 1997.

BACKGROUND OF THE INVENTION

The present invention relates to a method of stripping paint from a painted substrate, especially a metal substrate. The stripper comprises an aqueous phase and an organic phase. A wide range of organic solvents have been used in paint stripper formulations. The most successful solvents are chlorinated hydrocarbons; especially methylene chloride. For environmental reasons, however, it is desirable for the levels of organic solvents, especially chlorinated solvents, to be reduced. The present invention allows reduced levels of chlorinated solvents to be used or even allows the use of such solvents to be avoided all together.

It is known to use water as an activator compound in organic solvent based paint strippers. Such compositions tend to have low levels of water, for instance less than 10%.

Other paint stripper compositions comprising both water and organic solvents which are immiscible with water have been described. Generally emulsifiers are added in quantities such that an emulsion of one phase in the other phase is formed. Such emulsions are storage stable and are required not to separate before use. Alternatively cosolvents may be added to create a homogeneous single phase system. Some examples are described for instance in DE-A-3325166, GB 1114220, EP-A-0611214 and US-A-4619706.

SUMMARY OF THE INVENTION-DETAILED DESCRIPTION OF THE INVENTION

We have now surprisingly found that paint stripper compositions comprising immiscible (i.e. only partially soluble) organic solvent and water, but which are not in the form of an emulsion, can be used as paint strippers with very useful properties.

In a new method of stripping paint from a painted substrate surface according to the invention, the surface is contacted with the aqueous phase of a two-phase liquid stripper composition comprising an aqueous phase which comprises water, dissolved water-soluble activator compound and an organic solvent which has a solubility in water in the range 0.1 to 10% by weight at 20° C. the organic solvent being present in the aqueous phase at a concentration of about the saturation level (as at the ambient conditions for the method) and comprising also an organic phase comprising the said organic solvent, which organic phase is in interfacial contact with the aqueous phase.

The inventors believe that it is the aqueous phase of the stripper composition which provides the primary stripping function, that is which attacks the paint on the substrate surface, thereby enabling its removal. It has been found that some thermal or mechanical agitation may enhance stripping. This enhancement may be due to provision of some solvent contact with the substrate. The solvent phase primarily provides a reservoir for dissolved solvent in the aqueous phase. In view of the continuous interfacial contact, as solvent is dragged out of the aqueous phase by contact with paint surfaces, it is replenished from the solvent phase. The solvent thereby remains dissolved in the aqueous phase at saturation level.

It is preferred for organic solvents to be used which have a solubility in water at 20°C. in the range 0.5 to 6.0% by weight. The level of dissolved solvent in the aqueous phase during the paint removal method may be higher than the end of that range, since it is possible for the methods to be carried out under conditions at which the solubility of the solvent in water is higher. Thus where the method is carried out at raised temperatures, the level of organic solvent in the aqueous phase may be at least 50% higher than the saturation level at 20° C. for instance at least 100% higher or more.

The organic solvent may include chlorinated hydrocarbons, for instance in combination with other organic solvents. Thus the invention allows lower levels of chlorinated solvents to be used when a combination of such solvent and another organic solvent with which the chlorinated solvent is miscible is used. Preferably, however, the stripper composition is free of chlorinated organic solvents.

Suitable organic solvents are, for instance, benzyl alcohol, methylene chloride, dibasic ester, which is an oxygenated solvent composed of a mixture of methyldiesters of glutaric, succinic and adipic acids, or ethyl-3-ethoxy propionate. The solubility of these solvents in water are benzyl alcohol 3.3%, methylene chloride 1.32%, dibasic ester 5.6% and ethyl ethoxypropionate 2.9%.

The dissolved activator compound present in the aqueous phase of the composition used in the invention may be any compound which increases the paint stripper activity. Such compounds may be selected for the specific paint which is to be removed and/or the substrate from which the paint is to be removed, in order to provide optimum paint removal characteristics and/or minimise damage to the underlying substrate. The compound may often be a pH modifying compound. Such pH modifiers may be acids and considerable benefits have been observed with such acid activated systems. Acid activators are usually organic acids, for instance trichloroacetic, alkyl benzene sulphonic acid, benzoic or lactic acid. Preferably a pH modifying compound is an alkali. Suitable alkalis are, for instance, alkali metal hydroxides, alkaline earth metal hydroxides, silicates, for instance of alkali metals and organic basic compounds such as amines or ammonium compounds.

Another category of activator compound is an oxidising agent. Such oxidising agents are found to improve the performance of the aqueous phase. One example of an oxidising agent is hydrogen peroxide. Another example is permanganate, usually potassium permanganate.

The composition may, in addition to one of the above mentioned activator compounds, contain a secondary activator, such as an alcohol, for instance a $C_{1-4}$ alcohol, preferably methanol.

The paint stripper composition may optionally contain surfactants, generally in low amounts such that the surfactant does not lead to the formation of an emulsion between the immiscible aqueous and organic phases. The inclusion of such surfactants may improve wetting of the substrate surface. Suitable surfactants are, for instance, alkyl benzene sulphonic acids, and fluorosurfactants. The surfactant is, generally, present in an amount of less than 2% by weight, more preferably less than 1% by weight, based on the total stripper composition weight.

Where the activator compound is a pH modifier, the pH is preferably above 9, more preferably above 10, or below 5, preferably below 4.

The present invention is of particular value where the stripping method uses an immersion technique, in which the article from which paint is to be stripped is dipped into a bath containing the stripper composition. In such embodiments, the stripper composition is generally present as a two-phase system with top and bottom continuous layers. Preferably the bottom layer is the organic solvent layer, that is the organic solvent preferably has a higher density than water. In this embodiment, the article from which paint is to be stripped is immersed in the top aqueous phase only and not into the bottom organic phase. After immersion for a suitable period of time, the article is removed from the bath.

The bath is reused for stripping paint from further articles. Where the bath is reused, it is generally necessary to replenish the bath to maintain an appropriate mixture of ingredients in the top aqueous phase. It is found that both solvent and water are dragged out of the bath whilst in addition the activator compound and solvent are consumed. Replenishment of the bath is straightforward in the invention which is convenient for the user. Thus since the bottom organic phase provides a reservoir of solvent for dissolution into the top aqueous phase, as the volume of the top phase becomes lower, it can be replenished merely by adding water. The aqueous phase maintains its saturation level of solvent since solvent can pass from the organic phase into the aqueous phase across the interfacial layer. The level of activator compound is maintained at the desired level by a continuous monitoring system and addition of activator compound either in neat form or in the form of a concentrated replenishment solution, usually in water. It is possible to use automated replenishment to control the total volume and activator compound concentration of the aqueous phase.

The total level of water in the stripper composition as a whole is generally in the range 50 to 99.5% by weight, preferably in the range 60 to 98% by weight, more preferably in the range 70 to 95%, especially 80 to 90% by weight.

An alternative embodiment of the stripping method of the invention, for non-immersion purposes, uses an application in place system, in which the stripper composition is generally brushed, sprayed or otherwise applied to the painted surface of a large substrate. Since such surfaces will include non-horizontal surfaces, in order to ensure that adequate levels of stripper composition are retained in contact with the painted substrate over sufficient periods of time, it is generally desirable to use a thickened composition. The thickened compositions may comprise a continuous aqueous phase and a dispersed organic phase. The organic solvent can cross the interface between the phases thereby providing a reservoir for solvent in the aqueous phase as in the first embodiment of the invention. The dispersion may be storage stable by virtue of the provision of a thickened continuous aqueous phase (as opposed to being an emulsion of dispersed organic phase in continuous aqueous phase).

Suitable thickeners for use in this embodiment of the invention must provide a thickening ability for the aqueous phase in the presence of the organic solvent at saturation levels and in the presence of the activator compound. Although naturally derived thickeners such as cellulose and starch derivatives may be used, the present inventors have found that improved performance and stability can be achieved using synthetic thickeners, for instance acrylic based associative thickeners such as are available under the trade mark Rheox or Rheovis. Inorganic thickeners, such as clays, for instance bentonite especially surface treated bentonite, may alternatively be used.

In the stripping method of the present invention, the substrate should, after having been in contact with the stripping composition for an adequate time to loosen the paint, be rinsed to remove stripper composition and loosened paint. Where the substrate has been immersed in a bath of the stripper composition, the article is removed from the bath and rinsed, for instance by immersion and/or spraying with water or an aqueous rinse solution. It may be desirable to use a pressurised water spray or to apply other mechanical assistance to remove loosened paint from the substrate. Where the stripper composition is applied in place, it is rinsed by a spray of water or aqueous rinse solution, for instance using a pressurised water spray.

The method of the present invention may be carried out under ambient, room temperature conditions. Alternatively the temperature of the stripper composition may be raised for instance where the composition is applied by immersion. Thus a bath of stripper composition may be heated to a temperature at which the stripping rate is improved. The present inventors have found that temperatures in the range 40 to 90° C. can be used. Generally it is found that improved results can be achieved when the temperature is raised to above 50° C. or even above 60° C. although it is generally unnecessary to use temperatures of more than 80° C. Thickened compositions are generally applied at ambient temperatures.

Where the composition is contacted with the substrate by immersion, it may be desirable for the body of stripper to be mechanically agitated. Such agitation should generally be inadequate to provide any stability to the two phase mixture against separation. Thus although such agitation may result in the temporary creation of a dispersed phase, this dispersed phase mixture will rapidly separate into two phases upon removal of the mechanical agitation.

The present invention is illustrated in the following worked examples.

EXAMPLE 1

The following ingredients are mixed together:

| | |
|---|---|
| benzyl alcohol | 20% wt. |
| water | 79.21% wt. |
| potassium silicate | 0.79% wt. |

The ingredients form a two-phase system with benzyl alcohol in the lower phase and with the potassium silicate in the top, aqueous phase which also contains benzyl alcohol at the solubility limit at the ambient temperature. Test substrates of unstoved (uncured) epoxy paint on an aluminium substrate were used. At room temperature, when the substrates where immersed in the aqueous layer, adequate removal was achieved after seven hours' contact.

Where the bath is used continuously, it can be topped up with water whilst benzyl alcohol is still present in the lower phase. The level of alkali (potassium silicate) can be monitored by appropriate means and the levels replenished as necessary.

Two adaptations of the above formulation were made in one of which 40 volume hydrogen peroxide was incorporated in an amount of 10 wt %, and in the other of which 5.00 wt % of potassium permanganate (and a further 5 wt % water) was added as activators. The resultant compositions gave improved performance.

EXAMPLE 2

This example represents a composition which contains methylene chloride, but in lower concentrations than prior art methylene chloride based strippers.

The following ingredients in the amounts shown were mixed together:

| | |
|---|---|
| water | 90% wt. |
| alkylbenzene sulphonic acid | 0.5% wt. |
| methanol | 2.0% wt. |
| methylene chloride | 6.0% wt. |
| trichloroacetic acid | 1.5% wt. |

The formulation provides a two-phase composition. The composition enabled acrylic paint to be stripped from steel substrates in six hours at ambient (room) temperature.

EXAMPLE 3

This example is of a thickened apply in place stripper. The following ingredients are mixed together:

| | |
|---|---|
| benzyl alcohol | 35.0% wt. |
| water | 62.31% wt. |
| wax | 1.0% wt. |
| rheolate 101 | 1.0% wt. |
| sodium silicate | 0.69% wt. |

This composition is applied by brush to painted substrates. The above composition has been found to strip polyurethane paint from aluminium substrates in two to three hours, acrylic paint from aluminium substrates in about two hours and epoxy paint from aluminium substrates in about two hours. The above stripper compositions were each removed from the substrate after the specified period of time and rinsed using water-spray. The strippers were found not to damage the underlying metal surface which could subsequently be re-painted.

What is claimed is:

1. A method of stripping paint from a substrate surface comprising the steps of:
   (i) providing a two-phase liquid stripper composition comprising;
      (a) an aqueous phase which comprises water, dissolved water-soluble activator compound and an organic solvent comprising benzyl alcohol, said aqueous phase having a saturation concentration for organic solvent, the organic solvent being present in the aqueous phase at a concentration of about said saturation concentration;
      (b) an organic phase comprising the said organic solvent, which organic phase is in interfacial contact with the aqueous phase;
   (ii) contacting the substrate surface with said aqueous phase; and
   (iii) stripping said paint from the substrate surface.

2. A method according to claim 1 in which the organic solvent has a solubility in water at 20° C. in a range of 0.5 to 6.0% by weight.

3. A method according to claim 1 in which the composition is at a temperature greater than 20° C. and the organic solvent is present in the composition at a level higher than the saturation concentration at 20° C.

4. A method according to any preceding claim 1 in which the composition is free of chlorinated solvent.

5. A method according to claim 1 in which the composition has a pH above 9.

6. A method according to claim 5 in which the activator is selected from the group consisting of alkali metal hydroxides, alkaline earth metal hydroxides, and silicates.

7. A method according to claim 1 in which the composition has a pH below 5.

8. A method according to claim 7 in which the activator is an organic acid selected from the group consisting of trichloroacetic acid, dobanic acid, benzoic acid and lactic acid.

9. A method according to claim 1 in which the activator is an oxidizing agent selected from the group consisting of hydrogen peroxide and potassium permanganate.

10. A method according to claim 1 in which the substrate is dipped in a bath containing the composition, the bath having two liquid layers, an upper layer comprising the aqueous phase and a lower layer comprising the organic phase.

11. A method according to claim 10 in which the bath is replenished after use by addition of water and activator.

12. A method according to claim 11 in which the composition in the bath is at a temperature in a range of 40–80° C.

13. A method according to claim 10 in which the composition in the bath is at a temperature in a range of 40–80° C.

14. A method according to claim 1 in which the composition contains a thickener and is applied as a coating to a substrate.

15. A method according to claim 1 in which the step of stripping comprises rinsing the substrate surface with water to remove softened paint.

* * * * *